ARVIN & WHITMORE.
Check-Row.
No. 61,981.                                    Patented Feb 12, 1867
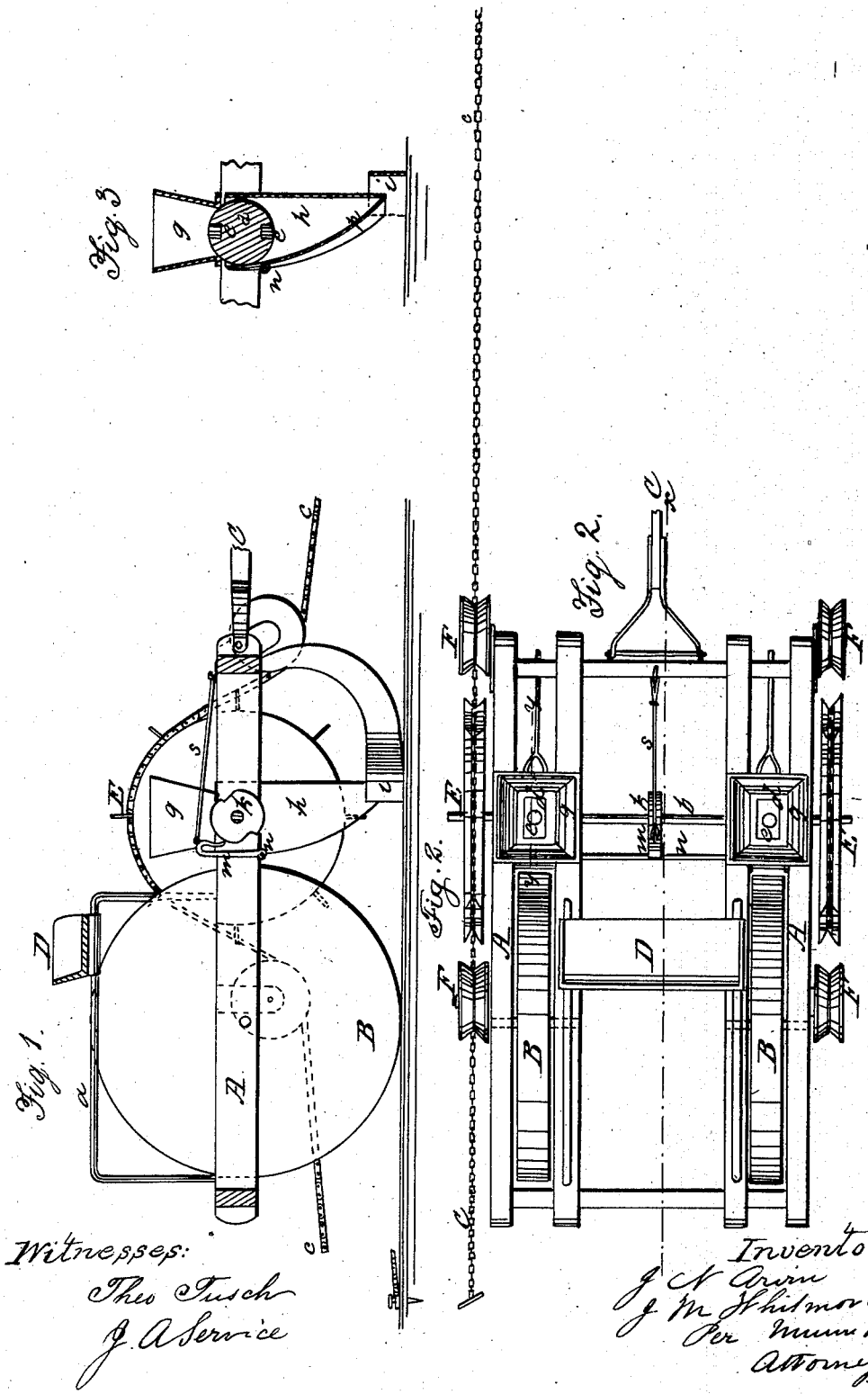

United States Patent Office.

JOHN N. ARVIN AND JOSEPH M. WHITMORE, OF VALPARAISO, INDIANA.

Letters Patent No. 61,981, dated February 12, 1867.

IMPROVEMENT IN CORN-PLANTERS.

*The Schedule referred to in these Letters Patent and making part of the same.*

TO ALL WHOM IT MAY CONCERN:

Be it known that we, JOHN N. ARVIN and JOSEPH M. WHITMORE, of Valparaiso, in the county of Porter, and State of Indiana, have invented a new Improvement in Corn-Planters; and we do hereby declare that the following is a full, clear, and exact description thereof, which will enable others skilled in the art to make and use the same, reference being had to the accompanying drawings, forming a part of this specification, in which—

Figure 1 is a longitudinal vertical section of our improved corn-planting machine taken in the plane of the line $x\ x$, fig. 2.

Figure 2 is a top view of the same.

Figure 3 is a partial section taken on the line $y\ y$, fig. 2.

Similar letters of reference indicate like parts.

This invention relates to an improvement in the arrangement of a machine for planting or dropping Indian corn automatically in regular checks, without furrowing, and consists in an apparatus placed on both sides of a truck or carriage frame, which is operated by means of a rope or chain stretched across a field in the line of the rows of corn to be planted, passing over pulleys in order to give the necessary motion to the planting apparatus and guide the machine, so as to make the rows straight and the checks at regular distances apart.

A is a strong rectangular truck frame, mounted on wheels B B. C is the draught-pole, and D a driver's seat, supported over the frame on rods, $a\ a$, upon which the seat may slide forward or back, to throw the weight of the driver more or less on the front part, and regulate the depth of the corn-planting as required. Forward of the wheels a shaft, $b$, crosses the frame, and projects out on both sides for receiving a driving-pulley, E, which is placed on either end, as required. The pulley E is grooved in its periphery to receive and carry a chain or rope, $c\ c$, which is stretched, as shown in fig. 1. The chain $c\ c$ passes over the pulley E and under two friction guide-pulleys, F F, one behind and the other in front of the driving-pulley E. The driving-pulley rotates the shaft $b$, which carries at each end a roller, $d$, in the periphery of which are hollows or caps, $e\ e$, to hold as many grains of corn as may be desired. The rollers $d\ d$ are placed in hoppers, $g\ g$, and pass through the bottoms of the hoppers, fitting so closely that no grains of corn can be dropped, except those contained in the cups $e\ e$. Under the hoppers are chutes, $h\ h$, which run down to the ground, and are connected at their lower ends with furrow openers, $i\ i$, that are fastened to the front end of the truck frame A. Between the hoppers $g\ g$ a notched cam, $k$, is placed on the shaft $b$, which works a pawl, $m$, so as to give a vibratory movement at regular intervals to a rod, $n$, on which the pawl is fastened in connection with an elastic spring, $s$, and thus open and shut the flaps $p\ p$ that extend down behind the hoppers $e\ e$, and regulate the dropping of the corn at equal distances apart.

In order to operate this machine, the chain or its equivalent is stretched across a field to be planted in the line of the row. One end of the chain is made fast to the ground. The machine is started at the end of the chain that is fastened, after being placed over the driving-pulley E, and under the friction guide-pulleys F F, as previously described. It is manifest that when the machine is moved, the chain $c\ c$ will rotate the pulley E, which will revolve the rollers $d\ d$ in the hoppers $g\ g$, and allow the grains of corn contained in the cups $e\ e$ to fall into the chutes $h\ h$, when, at the same time, the cam $k$ will move the pawl $m$, and operate the flaps $p\ p$ to open and shut them regularly, and drop the corn at regular intervals or spaces in the furrows made by the plough openers $i\ i$. When the machine is drawn to the end of the chain, take the driving-pulley E off, turn the machine around, place the driving-pulley on the opposite of the machine, fasten the end of the chain, and proceed as before, taking care to start in line with hills previously planted. The chain will need to be as long as the rows to be planted, and is moved from one row to the other the proper distance as the planting proceeds.

Having thus described our invention, what we claim as new, and desire to secure by Letters Patent, is—

The driving-pulley E and the friction-pulleys F F, in combination with the chain $c\ c$, the rollers $d\ d$ in the hoppers $g\ g$, and the cam $k$ on the shaft $b$, the pawl $m$ on the vibratory rod $n$, and the flaps $p\ p$ in the chutes $h\ h$, all arranged and operating as and for the purposes herein described.

The above specification of our invention signed by us this 22d day of November, 1866.

JOHN N. ARVIN,
JOSEPH M. WHITMORE.

Witnesses:
THOMAS JEWELL,
M. J. FIERSTINE.